(12) United States Patent
Takao

(10) Patent No.: US 11,815,411 B2
(45) Date of Patent: Nov. 14, 2023

(54) TACTILE SENSOR TO QUANTIFY HAIRY SKIN SENSATION

(71) Applicant: National University Corporation Kagawa University, Takamatsu (JP)

(72) Inventor: Hidekuni Takao, Takamatsu (JP)

(73) Assignee: National University Corporation Kagawa University, Takamatsu (JP)

( * ) Notice: Subject to any disclaimer, the term of this patent is extended or adjusted under 35 U.S.C. 154(b) by 356 days.

(21) Appl. No.: 17/309,004

(22) PCT Filed: Oct. 21, 2019

(86) PCT No.: PCT/JP2019/041253
§ 371 (c)(1),
(2) Date: Apr. 11, 2021

(87) PCT Pub. No.: WO2020/085277
PCT Pub. Date: Apr. 30, 2020

(65) Prior Publication Data
US 2021/0389192 A1    Dec. 16, 2021

(30) Foreign Application Priority Data

Oct. 22, 2018  (JP) ................................. 2018-198078

(51) Int. Cl.
*G01L 1/18*  (2006.01)

(52) U.S. Cl.
CPC ...................... *G01L 1/18* (2013.01)

(58) Field of Classification Search
CPC ........ G01B 21/30; G01B 7/008; G01B 7/001; G01B 7/016; G01B 7/012; G01B 5/012;
(Continued)

(56) References Cited

U.S. PATENT DOCUMENTS 4,523,383 A * 6/1985 Rogers ..................... B23Q 1/36
                                                                    33/832
4,616,511 A * 10/1986 Gindy ................... G01L 5/1627
                                                                    414/730
(Continued)

FOREIGN PATENT DOCUMENTS

JP    H1-201129 A    8/1989
JP    H5-081977 A    4/1993
(Continued)

OTHER PUBLICATIONS

International Search Report in International Application PCT/JP2019/041253, dated Dec. 18, 2019.
(Continued)

*Primary Examiner* — Tran M. Tran
(74) *Attorney, Agent, or Firm* — Modal PLLC

(57) ABSTRACT

A tactile sensor includes a base portion, a displacement portion, a displacement portion support body that supports the displacement portion in a displaceable manner in a first direction with respect to the base portion, a hair in a straight line arranged along a second direction, a hair fixing portion to which a base end of the hair is fixed, a hair fixing portion support body that turnably supports the hair fixing portion with respect to the displacement portion, a displacement detector that detects a displacement of the displacement portion with respect to the base portion, and a turn detector that detects a turn of the hair fixing portion with respect to the displacement portion. The sensations specific to the hairy skin, such as perception of a liquid surface and static electricity, can be detected from a shearing force and a moment acting on the hair.

7 Claims, 12 Drawing Sheets

(58) Field of Classification Search
CPC .......... G01B 5/207; G01B 7/28; G01L 1/162; G01L 1/26; G01G 23/12
See application file for complete search history.

(56) References Cited

U.S. PATENT DOCUMENTS

| | | | | |
|---|---|---|---|---|
| 4,660,296 A * | 4/1987 | Klingler | ............... | G01B 5/0016 33/559 |
| 4,747,313 A * | 5/1988 | Okada | ............... | G01L 5/162 73/862.043 |
| 4,882,848 A * | 11/1989 | Breyer | ............... | G01B 7/012 33/561 |
| 5,311,779 A * | 5/1994 | Teruo | ............... | G01L 1/205 73/753 |
| 5,390,424 A * | 2/1995 | Butter | ............... | G01B 11/007 33/561 |
| 5,428,548 A * | 6/1995 | Pilborough | ............... | G01B 7/008 850/10 |
| 5,517,124 A * | 5/1996 | Rhoades | ............... | G11B 5/3163 33/503 |
| 5,801,472 A * | 9/1998 | Wada | ............... | H02N 1/008 310/309 |
| 5,880,410 A * | 3/1999 | Neuman | ............... | G01G 23/08 177/229 |
| 6,286,226 B1 * | 9/2001 | Jin | ............... | H01H 1/06 977/956 |
| 6,826,960 B2 * | 12/2004 | Schaad | ............... | G01P 15/18 73/510 |
| 7,100,429 B2 * | 9/2006 | Matsuki | ............... | G01B 7/28 33/561 |
| 7,661,319 B2 * | 2/2010 | Liu | ............... | G01P 15/123 73/777 |
| 7,774,951 B2 * | 8/2010 | Hartmann | ............... | G01B 5/207 33/DIG. 13 |
| 7,802,475 B2 * | 9/2010 | Nishizawa | ............... | G01P 15/097 73/514.34 |
| 8,056,419 B2 * | 11/2011 | Liu | ............... | G01F 1/28 73/756 |
| 8,109,007 B2 * | 2/2012 | Solomon | ............... | G01F 1/32 33/701 |
| 8,312,779 B2 * | 11/2012 | Meiss | ............... | G01L 5/1627 73/862.68 |
| 8,448,514 B2 * | 5/2013 | Hartmann | ............... | G01L 5/1627 73/521 |
| 8,713,711 B2 * | 4/2014 | Adams | ............... | G01N 27/007 422/50 |
| 8,816,702 B2 * | 8/2014 | Tan | ............... | G01B 7/012 324/662 |
| 9,134,187 B1 * | 9/2015 | Organ | ............... | G05G 5/05 |
| 9,310,265 B2 * | 4/2016 | Shimoyama | ............ | G01L 5/228 |
| 9,528,824 B2 * | 12/2016 | Bos | ............... | G01B 7/012 |
| 9,535,086 B2 * | 1/2017 | Beyeler | ............... | G01Q 20/00 |
| 9,797,792 B2 * | 10/2017 | Moore | ............... | G01L 1/205 |
| 10,024,713 B1 * | 7/2018 | Martin | ............... | G01H 11/02 |
| 10,190,927 B2 * | 1/2019 | Takao | ............... | G01L 1/18 |
| 10,228,229 B2 * | 3/2019 | Antreasyan | ............ | G01B 7/012 |
| 10,393,495 B2 * | 8/2019 | Koga | ............... | G01B 7/012 |
| 10,655,960 B2 * | 5/2020 | Li | ............... | G01B 21/04 |
| 11,435,378 B2 * | 9/2022 | Beyeler | ............... | G01L 1/26 |
| 11,454,560 B2 * | 9/2022 | Song | ............... | G01L 5/169 |
| 11,474,126 B2 * | 10/2022 | Paros | ............... | G01P 15/0802 |
| 2001/0054237 A1 * | 12/2001 | Hidaka | ............... | G01B 7/012 33/561 |
| 2004/0040373 A1 * | 3/2004 | Saito | ............... | B82Y 35/00 73/104 |
| 2004/0118000 A1 * | 6/2004 | Roth | ............... | G01B 7/012 33/556 |
| 2008/0072683 A1 * | 3/2008 | Liu | ............... | G01P 15/0802 73/774 |
| 2008/0202222 A1 * | 8/2008 | Woody | ............... | B25J 7/00 73/105 |
| 2008/0264185 A1 * | 10/2008 | Kobayashi | ............ | G01D 5/183 73/862.637 |
| 2009/0044639 A1 * | 2/2009 | Maekawa | ............... | G01L 5/226 73/862.474 |
| 2016/0091376 A1 | 3/2016 | Sakano | | |
| 2016/0239086 A1 | 8/2016 | Do et al. | | |
| 2017/0067789 A1 | 3/2017 | Takao | | |

FOREIGN PATENT DOCUMENTS

| | | |
|---|---|---|
| JP | H11-014860 A | 1/1999 |
| JP | 2011-215000 A | 10/2011 |
| JP | 2016070824 A | 5/2016 |
| WO | WO2015133113 A1 | 9/2015 |

OTHER PUBLICATIONS

Extended European Search Report in counterpart European App. No. 19877222.0, dated Oct. 28, 2021, p. 1-9.

* cited by examiner

F I G. 1
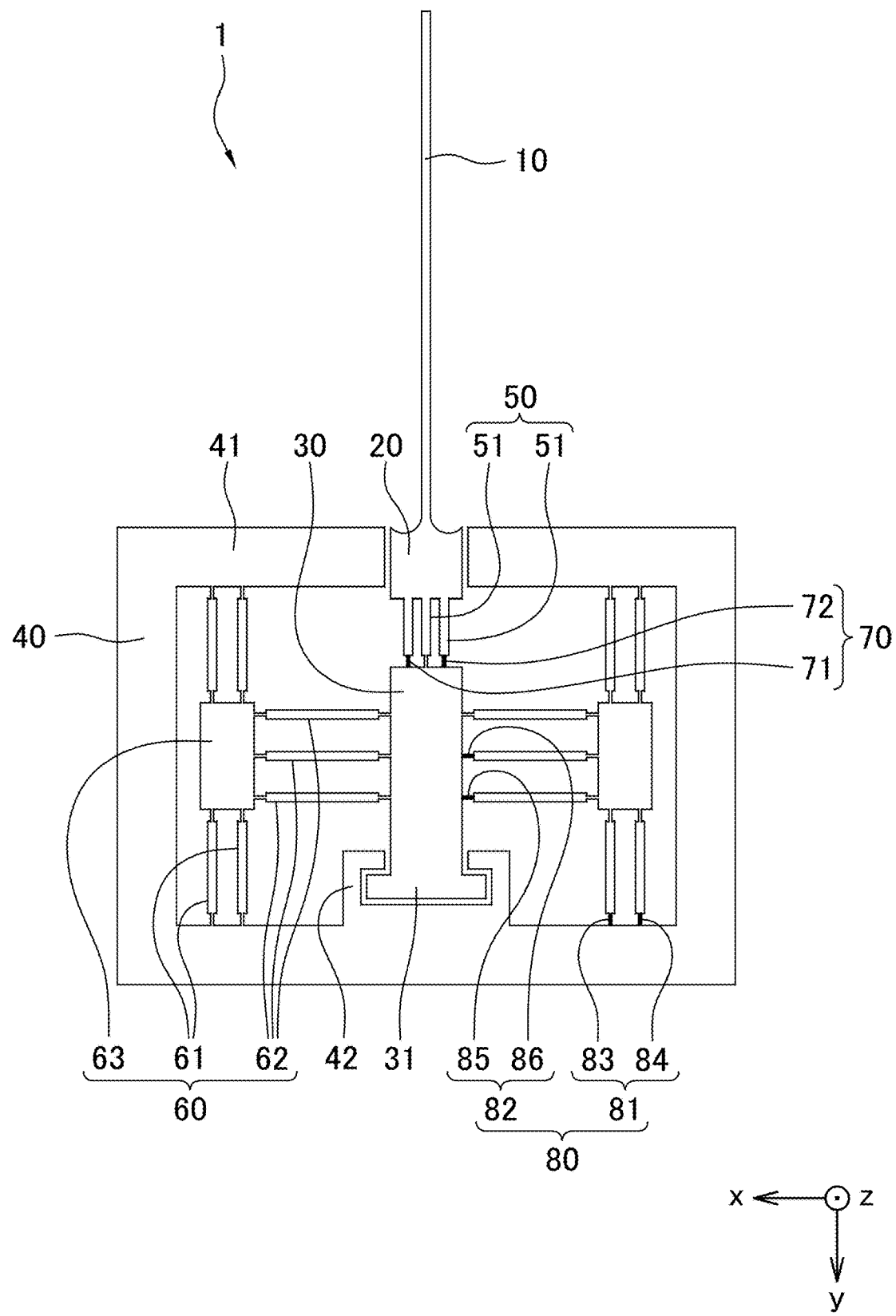

F I G. 6
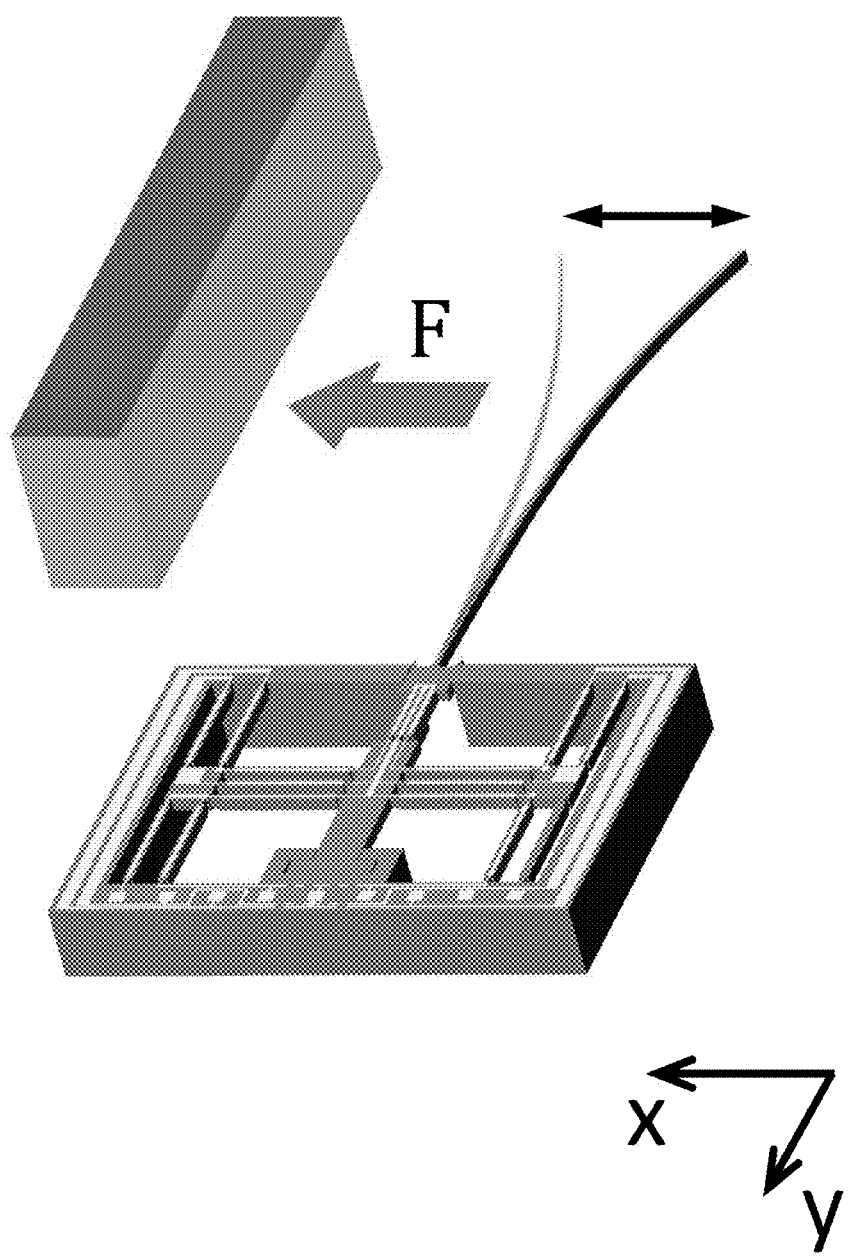

F I G. 1 2
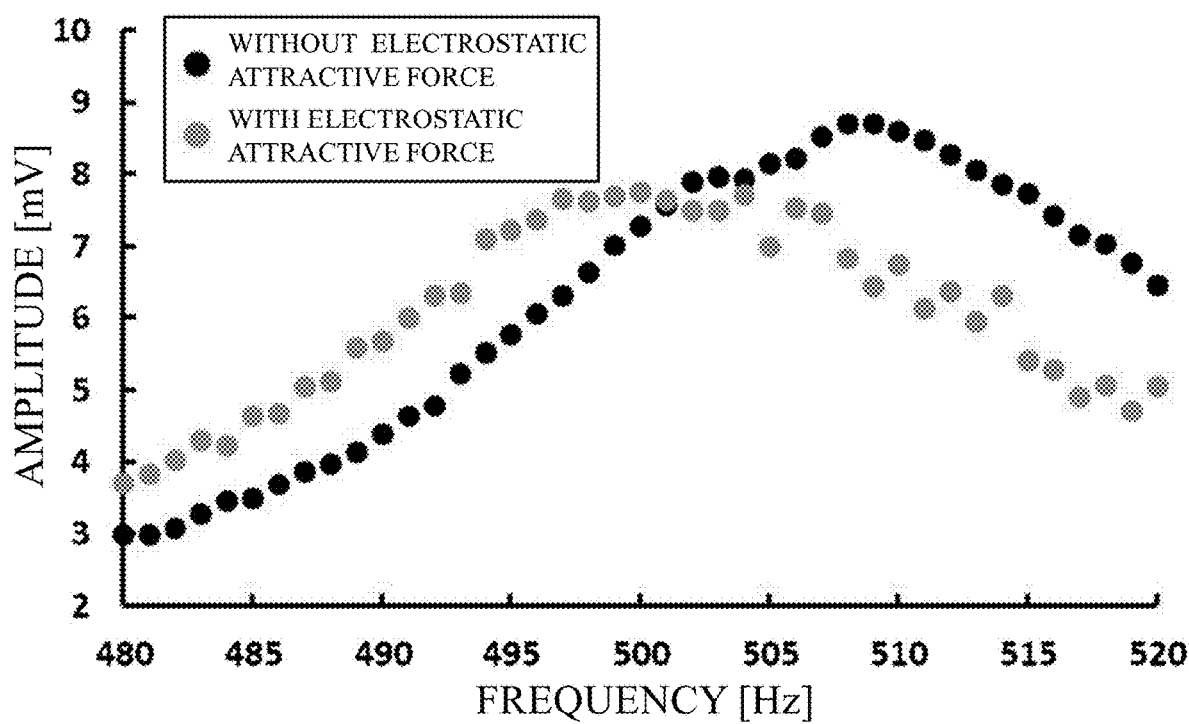

TACTILE SENSOR TO QUANTIFY HAIRY SKIN SENSATION

CROSS-REFERENCES TO RELATED APPLICATIONS

This application is the U.S. National Phase of PCT International Application No. PCT/JP2019/041253, filed on Oct. 21, 2019. That application claims priority to Japanese Patent Application No. 2018-198078, filed Oct. 22, 2018. The contents of both applications are herein incorporated by reference in their entirety.

TECHNICAL FIELD

The present invention relates to a tactile sensor. More specifically, the present invention relates to a tactile sensor for use to quantify a tactile sensation felt by a human.

BACKGROUND ART

Various tactile sensors that simulate a human tactile sensation in an engineering manner have been developed. Especially, a tactile sensor that is made by semiconductor micromachining techniques and can read a lot of sensor signals with less wiring allows a lot of sensor parts to be arranged in high density, and advantageously has high position resolution.

WO 2015/133113 discloses a tactile sensor that has a contact with a small tip. The tactile sensor is slid while it is pressed against a measuring object, and a displacement of the contact is detected, and thus, fine ruggedness and a friction force in a minute region on a surface of the measuring object can be detected.

BRIEF SUMMARY OF INVENTION

A human skin has a plurality of mechanoreceptors. A sensation of touching a substance is obtained by a function of the mechanoreceptors. The human skin is classified into a glabrous skin, such as a fingertip and a bottom of foot, and a hairy skin, such as an arm and a shin. The glabrous skin and the hairy skin have partly different mechanoreceptors that exist. Mechanoreceptors specific to the hairy skin include a hair follicle cell. It is considered that sensations specific to the hairy skin, such as perception of a liquid surface and static electricity, is obtained by the hair follicle cell.

The tactile sensor in WO 2015/133113 includes a contact imitating a fingerprint on a fingertip, and can quantify a tactile sensation of the glabrous skin. On the other hand, a sensor that quantifies the sensations specific to the hairy skin has not sufficiently been developed so far.

In consideration of the above-described circumstance, the object of the present invention is to provide a tactile sensor that allows detecting sensations specific to a hairy skin.

A tactile sensor of a first invention includes a base portion, a displacement portion, a displacement portion support body, a hair, a hair fixing portion, a hair fixing portion support body, a displacement detector, and a turn detector. The displacement portion support body supports the displacement portion in a displaceable manner at least in a first direction with respect to the base portion. The hair in a straight line is arranged along a second direction perpendicular to the first direction. To the hair fixing portion, a base end of the hair is fixed. The hair fixing portion support body turnably supports the hair fixing portion within a plane including the first direction and the second direction with respect to the displacement portion. The displacement detector detects a displacement of the displacement portion with respect to the base portion. The turn detector detects a turn of the hair fixing portion with respect to the displacement portion.

In a tactile sensor of a second invention, which is in the first invention, the displacement portion support body supports the displacement portion in a displaceable manner also in the second direction with respect to the base portion, and the displacement detector includes a first displacement detector that detects a displacement in the first direction of the displacement portion and a second displacement detector that detects a displacement in the second direction of the displacement portion.

In a tactile sensor of a third invention, which is in the first invention or the second invention, the hair is integrally formed with the hair fixing portion.

In a tactile sensor of a fourth invention, which is in the first invention or the second invention, the hair fixing portion includes an insertion portion in a depressed shape, and the hair has a base end portion inserted into the insertion portion.

In a tactile sensor of a fifth invention, which is in the fourth invention, the insertion portion has an inner wall on which two rows of comb teeth arranged to be opposed are formed.

In a tactile sensor of a sixth invention, which is in the fifth invention, a plurality of teeth constituting the comb teeth are each inclined in an insertion direction of the hair from a base end toward a distal end.

In a tactile sensor of a seventh invention, which is in the first invention or the second invention, the hair is fixed with an adhesive to the hair fixing portion.

With the first invention, a shearing force acting on the hair can be obtained from a detected value of the displacement detector and a moment acting on the hair can be obtained from a detected value of the turn detector. Sensations specific to a hairy skin, such as perception of a liquid surface and static electricity can be detected from the shearing force and the moment acting on the hair.

With the second invention, an axial force acting on the hair can be obtained from a detected value of the second displacement detector. Static electricity and the like can be detected from the axial force acting on the hair.

With the third invention, since the hair and the hair fixing portion are integrally formed, the number of components is reduced, thereby allowing a simple manufacturing process of the tactile sensor.

With the fourth invention, since the hair and other portions of the tactile sensor are different members, hairs of various materials and shapes can be employed as the hair installed in the tactile sensor.

With the fifth invention, sandwiching the base end portion of the hair with the two rows of the comb teeth allows firmly fixing the hair with respect to the hair fixing portion.

With the sixth invention, since the teeth of the comb teeth are inclined in the insertion direction, the hair is easily inserted into the insertion portion and is less likely to be pulled out.

With the seventh invention, since the hair and other portions of the tactile sensor are different members, hairs of various materials and shapes can be employed as the hair installed in the tactile sensor.

BRIEF DESCRIPTION OF DRAWINGS

FIG. 1 is a plan view of a tactile sensor according to one embodiment of the present invention.

FIG. 6 is an explanatory drawing illustrating a measurement principle of an electrostatic attractive force.

FIG. 12 is a graph illustrating amplitudes of moments before and after applying the electrostatic attractive force.

DETAILED DESCRIPTION OF EMBODIMENTS

Figure 2A:
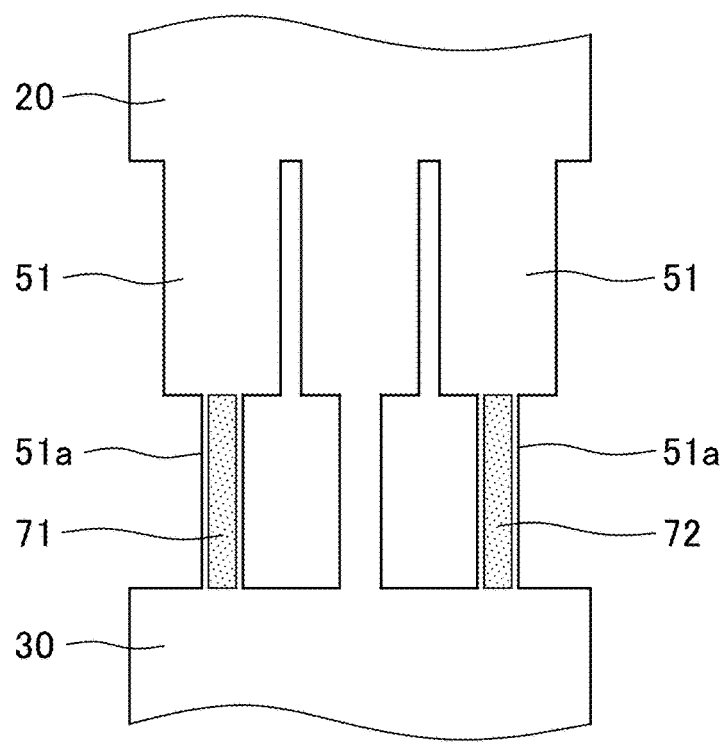
FIG. 2A is an explanatory drawing of first and second strain detection elements when there is no strain in a longitudinal beam of a hair fixing portion support body.

Next, embodiments of the present invention will be described based on drawings.

(Tactile Sensor)

As illustrated in FIG. 1, a tactile sensor 1 according to one embodiment of the present invention is formed by processing a semiconductor substrate, such as a SOI substrate, by semiconductor micromachining techniques.

The tactile sensor 1 includes a hair 10, a hair fixing portion 20, a displacement portion 30, and a base portion 40. Between the hair fixing portion 20 and the displacement portion 30, a hair fixing portion support body 50 that supports the hair fixing portion 20 with respect to the displacement portion 30 is disposed. Between the displacement portion 30 and the base portion 40, a displacement portion support body 60 that supports the displacement portion 30 with respect to the base portion 40 is disposed. These constituting members are formed by etching a semiconductor substrate in a predetermined pattern to remove an unnecessary part. Accordingly, the tactile sensor 1 is in a flat plate shape as a whole.

In this description, an x-direction, ay-direction, and a z-direction are defined as illustrated in FIG. 1. The x-direction, they-direction, and the z-direction are also referred to as a first direction, a second direction, and a third direction, respectively. The y-direction is perpendicular to the x-direction. The z-direction is perpendicular to an x-y plane (a plane including the x-direction and the y-direction). The flat plate-shaped tactile sensor 1 is arranged parallel to the x-y plane. The z-direction corresponds to a thickness direction of the tactile sensor 1.

The tactile sensor 1 detects an external force acting on the hair 10. Of all the external forces acting on the hair 10, the external force in a direction (the x-direction) perpendicular to a longitudinal direction of the hair 10 is referred to as a "shearing force." The external force along the longitudinal direction (the y-direction) of the hair 10 is referred to as an "axial force." When the shearing force acts on the hair 10, a moment that turns the hair 10 in the x-y plane is generated.

Of all constituting members of the tactile sensor 1, a part other than the hair 10 is referred to as a "sensor main body." The overall dimension of the sensor main body is not specifically limited, but it is 1 to 20 mm square.

The hair 10 is an elongated member in a straight line. The hair 10 may have elasticity. The hair 10 is only necessary to be in an approximately straight line in a state where no external force is acting on it. The hair 10 may be slightly curved like human hair. A length of the hair 10 is not specifically limited, but it is 1 to 20 mm. A thickness of the hair 10 is not specifically limited, but it is 1 to 100 μm. The thickness may be set such that the hair 10 can obtain desired rigidity.

The hair 10 is arranged along the y-direction outside the base portion 40. The hair 10 has a base end fixed to the hair fixing portion 20. The hair fixing portion 20 turns in the x-y plane when a moment is generated on the hair 10.

The hair fixing portion 20 and the displacement portion 30 are coupled via the hair fixing portion support body 50. The hair fixing portion support body 50 is formed of one or a plurality of longitudinal beams 51. Each of the longitudinal beams 51 have elasticity and have a similar property to that of a plate spring. Each of the longitudinal beams 51 are arranged along the y-direction. The longitudinal beam 51 allows the hair fixing portion 20 to turn in the x-y plane. That is, the hair fixing portion 20 is supported in a turnable manner in the x-y plane with respect to the displacement portion 30. Here, the hair 10 and the hair fixing portion 20 turn about the hair fixing portion support body 50 (more specifically, a narrow-width portion 51a described below).

While in this embodiment, three longitudinal beams 51 are disposed, the number and the dimension thereof are not specifically limited. The number and the dimension of the longitudinal beams 51 are only necessary to be set such that the elasticity required for the hair fixing portion support body 50 is obtained.

In this embodiment, one end portions of the respective longitudinal beams 51 are thinner the other portions. Thus disposing the narrow-width portions 51a (see FIG. 2A) in the longitudinal beam 51 easily generates a strain in the longitudinal beam 51. Even when a moment generated on the hair 10 is small, the hair fixing portion 20 easily turns. Therefore, the moment generated on the hair 10 can be detected with high sensitivity.

The displacement portion 30 is a rod-shaped member, and its center axis is arranged along they-direction. The displacement portion 30 displaces in the x-direction when a shearing force acts on the hair 10. The displacement portion 30 displaces in the y-direction when an axial force acts on the hair 10.

The base portion 40 is a rectangular frame having edge members surrounding four sides thereof. One edge member 41 constituting the base portion 40 has an opening provided at its center. An inside and an outside of the base portion 40 are communicated via this opening. The hair fixing portion 20 is arranged in the opening of the base portion 40. The base portion 40 has an internal space where the displacement portion 30 is disposed.

The displacement portion 30 and the base portion 40 are coupled via the displacement portion support body 60. The displacement portion support body 60 is formed of a plurality of longitudinal beams 61, a plurality of lateral beams 62, and two islands 63. In the internal space of the base portion 40, the two islands 63 are arranged at positions between which the displacement portion 30 is interposed. Each of the longitudinal beam 61 are bridged between the base portion 40 and the island 63. Each of the lateral beams 62 are bridged between the island 63 and the displacement portion 30.

Each of the longitudinal beams 61 have elasticity and have a similar property to that of a plate spring. Each of the longitudinal beams 61 are arranged along the y-direction. Accordingly, the longitudinal beam 61 allows a displacement in the x-direction of the displacement portion 30. Each of the lateral beams 62 have elasticity and have a similar property to that of a plate spring. Each of the lateral beams 62 are arranged along the x-direction. Accordingly, the lateral beam 62 allows a displacement in the y-direction of the displacement portion 30. That is, the displacement portion 30 is supported in a displaceable manner in the x-direction and the y-direction with respect to the base portion 40.

While in this embodiment, a total of eight longitudinal beams 61, two each on both sides of each of the islands 63, are disposed, the number and the dimension thereof are not specifically limited. While a total of six lateral beams 62, three each on both sides of the displacement portion 30, are disposed, the number and the dimension thereof are not specifically limited. The numbers and the dimensions of the longitudinal beam 61 and the lateral beam 62 are only necessary to be set such that the required elasticity is obtained as the displacement portion support body 60.

In this embodiment, both ends of each of the longitudinal beams 61 are thinner than the other parts. Thus disposing a narrow-width portion 61a (see FIG. 4A) in the longitudinal beam 61 easily generates a strain in the longitudinal beam 61. Even when a shearing force acting on the hair 10 is small, the displacement portion 30 is easily displaced in the x-direction. Therefore, the shearing force acting on the hair 10 can be detected with high sensitivity.

Similarly, both ends of each of the lateral beams 62 are thinner than the other parts. Thus disposing the narrow-width portion in the lateral beam 62 easily generates a strain in the lateral beam 62. Even when an axial force acting on the hair 10 is small, the displacement portion 30 is easily displaced in the y-direction. Therefore, the axial force acting on the hair 10 can be detected with high sensitivity.

In order to restrict the turn of the hair fixing portion 20 within a predetermined amount, the hair fixing portion 20 and the base portion 40 have the following structures. The hair fixing portion 20 is arranged in the opening provided in the edge member 41. The opening has side surfaces opposed to side surfaces of the hair fixing portion 20. A predetermined interval is made between the side surfaces of the opening and the side surfaces of the hair fixing portion 20. An increased turn amount of the hair fixing portion 20 brings the hair fixing portion 20 into contact with the base portion 40 to stop turning any more. This allows avoiding a damage of the tactile sensor 1 caused by over-turning of the hair fixing portion 20.

In order to restrict the displacement of the displacement portion 30 within a predetermined amount, the displacement portion 30 and the base portion 40 have the following structure. The displacement portion 30 has one end portion at which a T-shaped projecting portion 31 is formed. The base portion 40 includes a restriction portion 42 in a shape surrounding the projecting portion 31. A predetermined interval is made between the projecting portion 31 and the restriction portion 42. An increased displacement amount of the displacement portion 30 brings the projecting portion 31 into contact with the restriction portion 42 to stop displacing any more. This allows avoiding a damage of the tactile sensor 1 caused by over-displacement of the displacement portion 30.

In order to detect the turn of the hair fixing portion 20 with respect to the displacement portion 30, the tactile sensor 1 is provided with a turn detector 70. The turn detector 70 is made of first and second strain detection elements 71 and 72 that detect a strain of the longitudinal beam 51.

A piezoresistive element can be used as the first and second strain detection elements 71 and 72. The piezoresistive element is formed on a surface of the longitudinal beam 51 by an integrated circuit manufacturing process, such as an impurity diffusion and an ion implantation, a metal wiring forming technique, and the like.

As illustrated in FIG. 2A, one longitudinal beam 51 among the plurality of longitudinal beams 51 includes the first strain detection element 71 on a surface of the narrow-width portion 51a. Another one longitudinal beam 51 includes the second strain detection element 72 on the surface of the narrow-width portion 51a.

Figure 2B:
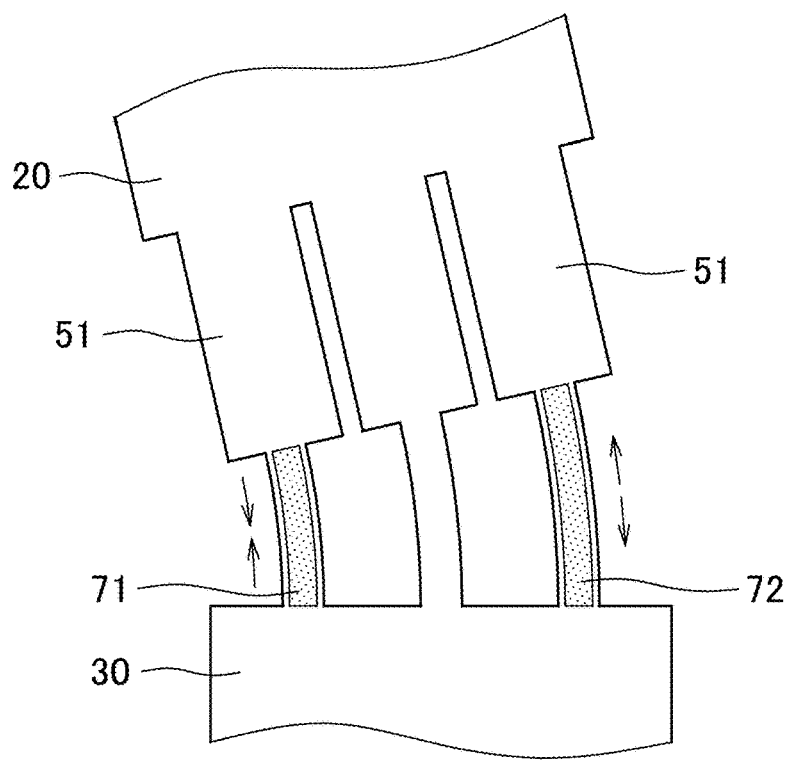
FIG. 2B is an explanatory drawing of the first and second strain detection elements when there is a strain in the longitudinal beam of the hair fixing portion support body.

As illustrated in FIG. 2B, when the hair fixing portion 20 turns with respect to the displacement portion 30, a strain is generated in the longitudinal beams 51. In this respect, a resistance of the first strain detection element 71 decreases due to a compressive stress and a resistance of the second strain detection element 72 increases due to a tensile stress. When the turning direction of the hair fixing portion 20 is inverted, the first strain detection element 71 has an increased resistance due to the tensile stress and the second strain detection element 72 has a decreased resistance due to the compressive stress.

Figure 3:
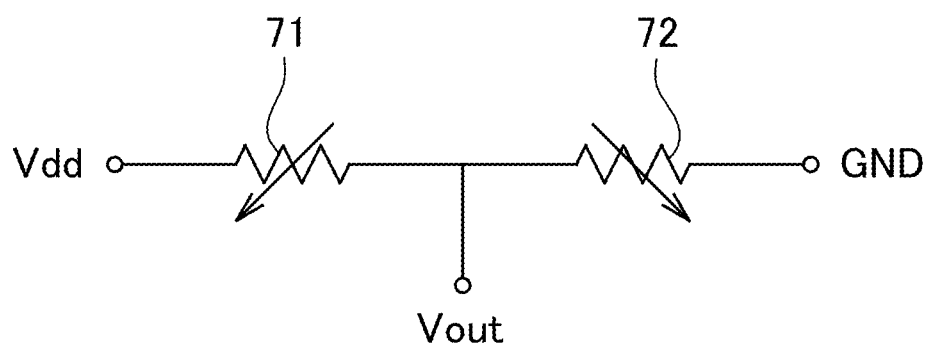
FIG. 3 is a circuit diagram of a strain detection circuit.

As illustrated in FIG. 3, a strain detection circuit (not illustrated in FIG. 1 or FIG. 2) that detects a strain of the longitudinal beam 51 is formed on a surface of the tactile sensor 1. The strain detection circuit is a circuit that couples the first strain detection element 71 with the second strain detection element 72 in series and applies a voltage $V_{dd}$ on both ends, and reads a voltage $V_{out}$ between the first strain detection element 71 and the second strain detection element 72. The voltage $V_{out}$ changes by the difference between the first and second strain detection elements 71 and 72. Reading the voltage $V_{out}$ can detect a strain amount of the longitudinal beam 51. This allows detecting the turning amount of the hair fixing portion 20 with respect to the displacement portion 30 with the turn detector 70. From the turning amount of the hair fixing portion 20, a moment generated on the hair 10 can be obtained.

In the case that the longitudinal beam 51 is one, it is only necessary to arrange the first strain detection element 71 along one side portion of the longitudinal beam 51 and arrange the second strain detection element 72 along the other side portion. The turn detector 70 may be configured to detect a turn in a y-z plane of the hair fixing portion 20.

When the hair fixing portion 20 turns in the y-z plane, both the resistances of the first and second strain detection elements 71 and 72 decrease or increase. The turning amount in the y-z plane of the hair fixing portion 20 may be detected based on this. By doing so, a moment in the y-z plane generated on the hair 10 can be obtained.

As illustrated in FIG. 1, in order to detect a displacement of the displacement portion 30 with respect to the base portion 40, the tactile sensor 1 includes a displacement detector 80. The displacement detector 80 includes a first displacement detector 81 that detects a displacement in the x-direction of the displacement portion 30 and a second displacement detector 82 that detects a displacement in they-direction of the displacement portion 30. The first displacement detector 81 is formed of third and fourth strain detection elements 83 and 84 that detect a strain of the longitudinal beam 61. The second displacement detector 82 is formed of fifth and sixth strain detection elements 85 and 86 that detect a strain of the lateral beam 62. The piezoresistive element can be used as the third to sixth strain detection elements 83 to 86.

Figure 4A:
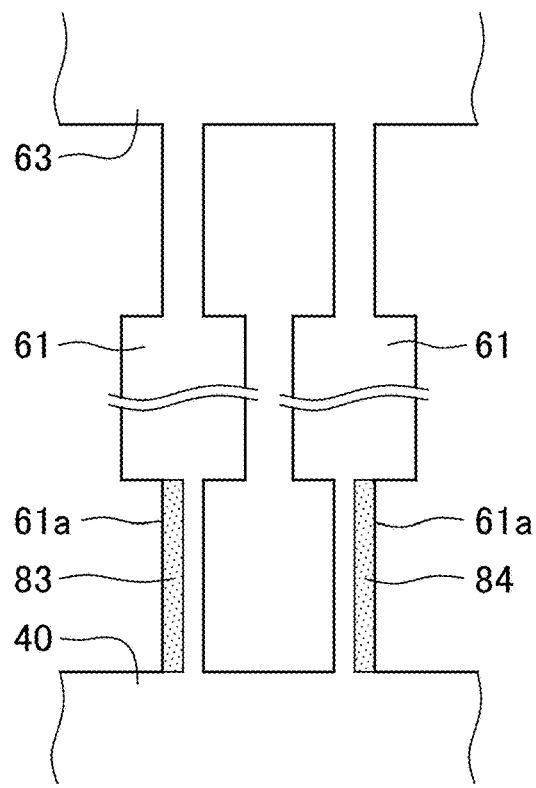
FIG. 4A is an explanatory drawing of third and fourth strain detection elements when there is no strain in a longitudinal beam of a displacement portion support body.

As illustrated in FIG. 4A, one longitudinal beam 61 among the plurality of longitudinal beams 61 includes the third strain detection element 83 on a surface of the narrow-width portion 61a. Another one longitudinal beam 61 includes the fourth strain detection element 84 on the surface of the narrow-width portion 61a. The third and fourth strain detection elements 83 and 84 are arranged along one side portions of the respective narrow-width portions 61a. Here, the third and fourth strain detection elements 83 and 84 are arranged on the side portions opposite to one another. In the example illustrated FIG. 4A, the third strain detection element 83 is arranged on the left side portion and the fourth strain detection element 84 is arranged on the right side portion.

Figure 4B:
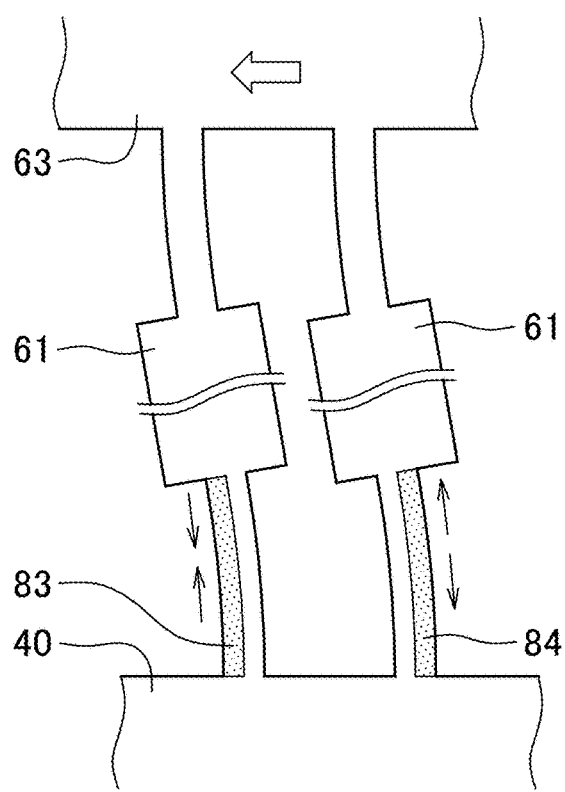
FIG. 4B is an explanatory drawing of the third and fourth strain detection elements when there is a strain in the longitudinal beam of the displacement portion support body.

When the displacement portion 30 displaces in the x-direction with respect to the base portion 40 as illustrated in FIG. 4B, a strain is generated in the longitudinal beams 61. In this respect, the third strain detection element 83 has a decreased resistance due to the compressive stress and the fourth strain detection element 84 has an increased resistance due to the tensile stress. When the displacement direction of the displacement portion 30 is inverted, the third strain detection element 83 has an increased resistance due to the tensile stress and the fourth strain detection element 84 has a decreased resistance due to the compressive stress.

A strain detection circuit that detects a strain of the longitudinal beam 61 is formed on the surface of the tactile sensor 1. This strain detection circuit is similar to the strain detection circuit of the turn detector 70. The first displacement detector 81 can detect a displacement in the x-direction of the displacement portion 30 with respect to the base portion 40. From the displacement in the x-direction of the displacement portion 30, a shearing force that acts on the hair 10 can be obtained.

Configurations of the fifth and sixth strain detection elements 85 and 86 and the strain detection circuit of the second displacement detector 82 are similar to configurations of the third and fourth strain detection elements 83 and 84 and the strain detection circuit of the first displacement detector 81. The second displacement detector 82 can detect a displacement in they-direction of the displacement portion 30 with respect to the base portion 40. From the displacement in the y-direction of the displacement portion 30, an axial force that acts on the hair 10 can be obtained.

The turn detector 70 may be configured to detect a displacement in the z-direction of the displacement portion 30. When the displacement portion 30 displaces in the z-direction, both the resistances of the third and fourth strain detection elements 83 and 84 decrease or increase. Based on this, the displacement amount in the z-direction of the displacement portion 30 may be detected. By doing so, a shearing force in the z-direction acting on the hair 10 can be obtained.

(Manufacturing Method)

Next, a method for manufacturing the tactile sensor 1 that uses the SOI substrate will be described.

Here, the SOI substrate has a three-layer structure of a supporting substrate (silicon), an oxide film layer (silicon dioxide), and an active layer (silicon) and its thickness is, for example, 300 μm.

First, the substrate is cleaned and an oxidation treatment is performed on the substrate to form a surface oxide film. Next, the surface oxide film is processed to form a diffusion layer pattern that becomes the circuit portion, and phosphorus diffusion is performed. Next, a chrome thin film is sputtered on a back surface of the substrate and the chrome thin film is processed into a pattern to release a movable structure portion. Next, the surface oxide film is removed and etched by ICP-RIE to form the movable structure portion. After filling a resist near the formed movable structure portion for protection, the back surface is etched by ICP-RIE. Finally, an intermediate oxide film and the resist are removed to release the movable structure portion.

The hair 10 of this embodiment is formed by processing a semiconductor substrate. Therefore, the hair 10 is integrally formed with the hair fixing portion 20. Such a configuration reduces the number of components of the tactile sensor 1, thereby allowing a simple manufacturing process of the tactile sensor 1.

(Detection Method)

Next, a detection method by the tactile sensor 1 will be described.

When a detection is performed with the tactile sensor 1, an external force is applied by, for example, bringing the hair 10 into contact with a measuring object. When a moment is generated on the hair 10, a strain is generated in the hair fixing portion support body 50. The strain is detected by the turn detector 70 to obtain the moment. When a shearing force and an axial force acts on the hair 10, a strain is generated in the displacement portion support body 60. The strain is detected by the displacement detector 80 to obtain the shearing force and the axial force. From the moment, the shearing force, and the axial force acting on the hair 10, a surface tension of a liquid, static electricity, and the like can be measured. The following sequentially describes the details.

Surface Tension of Liquid

Figure 5:
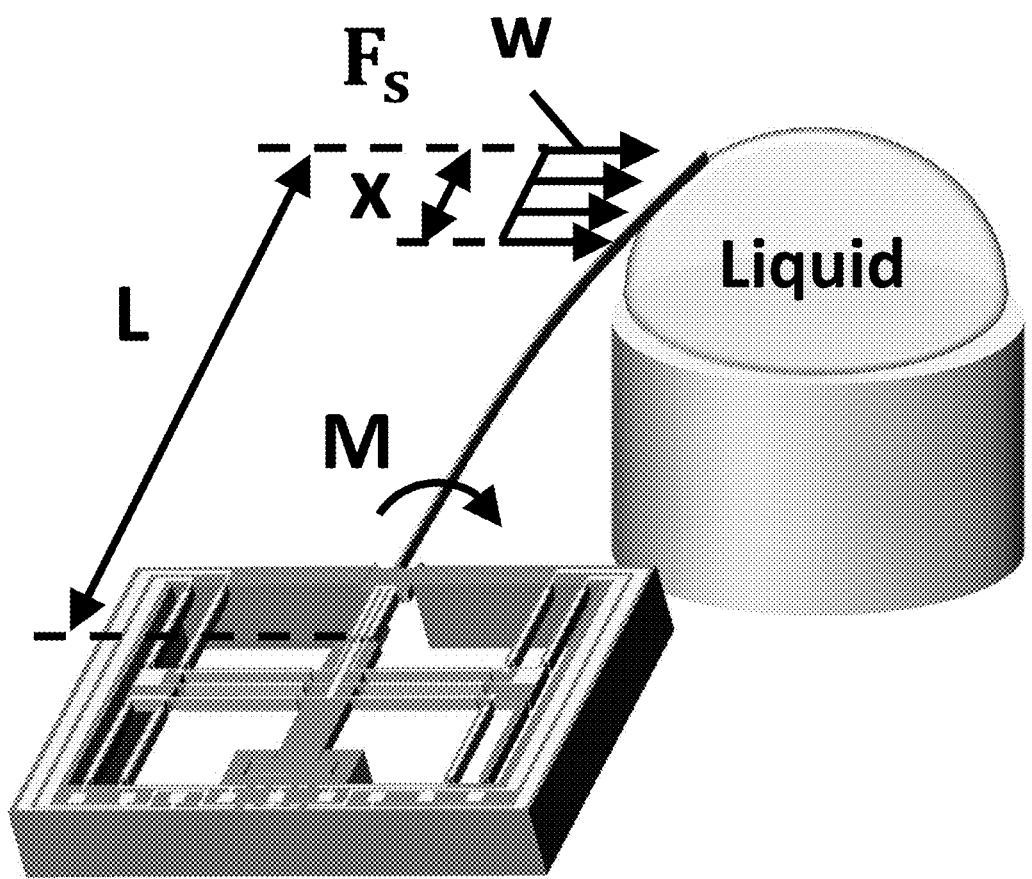
FIG. 5 is an explanatory drawing illustrates a measurement principle of a surface tension of a liquid.

FIG. 5 illustrates a measurement principle of a surface tension of a liquid. When the hair 10 of the tactile sensor 1 is separated from a surface of the liquid, a distribution load by the surface tension of the liquid acts on the hair 10. Here, the surface tension acting on the hair 10 is assumed to be a uniformly distributed load w. When the uniformly distributed load w is assumed to act on a distal end portion (a portion of a length x) of a cantilever beam of a length L, a shearing force $F_s$ and a moment M that act on the hair 10 are expressed in the following formulae (1) and (2).

$$F_s = wx \quad (1)$$

$$M = F_s\left(L - \frac{x}{2}\right) \quad (2)$$

Assigning the length x obtained from the formula (2) into the formula (1) obtains the uniformly distributed load w as illustrated in a formula (3).

$$w = \frac{F_s}{2\left(L - \frac{M}{F_s}\right)} \quad (3)$$

In the formula (3), the length L has been already known and the shearing force $F_s$ and the moment M can be measured with the tactile sensor 1. Accordingly, the tactile sensor 1 can obtain the surface tension w of the liquid.

Static Electricity

An electrostatic attractive force acting on the hair 10 can be directly obtained from the shearing force or the axial force detected by the tactile sensor 1. Besides, as described below, use of a resonance frequency of the hair 10 allows measuring the electrostatic attractive force with higher sensitivity.

FIG. 6 illustrates a measurement principle of the electrostatic attractive force. The tactile sensor 1 vibrates in the x-direction by a vibration device. The hair 10 that resonates can be assumed by a simple spring-mass model configured of an equivalent mass m and a spring (spring constant k). Here, a resonance frequency $f_0$ of the hair 10 is expressed by the following formula (4).

$$f_0 = \frac{1}{2\pi}\sqrt{\frac{k}{\frac{33}{140}m}} \quad (4)$$

Assume that the electrostatic attractive force F in the x-direction acts on the hair 10. The state where a force gradient is applied on the resonated hair 10 can be considered that a pseudo spring (spring constant k') is coupled in parallel to the spring mass of the hair 10. As expressed in Formula (5), the resonance frequency of the hair 10 shifts from the frequency $f_0$ when the electrostatic attractive force F does not act by $\Delta f$.

$$f_0 + \Delta f = \frac{1}{2\pi}\sqrt{\frac{k + k'}{\frac{33}{140}m}} \quad (5)$$

As can be seen from the formula (5), the spring constant k' can be obtained from the shift amount $\Delta f$ of the resonance frequency. As illustrated in a formula (6), the spring constant k' is expressed by the force gradient of the electrostatic attractive force F. Accordingly, the electrostatic attractive force F can be obtained from the spring constant k'. Thus, the electrostatic attractive force F can be obtained from the change of the resonance frequency of the hair 10. When the force gradient is an attractive force, the spring constant k' is negative and the resonance frequency shifts in a negative direction. When the force gradient is a repulsive force, the spring constant k' is positive and the resonance frequency shifts in a positive direction.

$$k' = \frac{\partial F}{\partial x} \quad (6)$$

Besides, the use of the tactile sensor 1 can detect a minute airflow or the like.

As described above, the shearing force that acts on the hair 10 can be obtained from the detected value of the first displacement detector 81 and the moment that acts on the hair 10 can be obtained from the detected value of the turn detector 70. The surface tension of the liquid, the static electricity, and the like can be detected from the shearing force and the moment acting on the hair 10. The axial force acting on the hair 10 can be obtained from the detected value of the second displacement detector 82. The static electricity and the like can be detected from the axial force acting on the hair 10. Thus, the tactile sensor 1 can detect the sensations specific to the hairy skin, such as perception of a liquid surface and static electricity.

Other Embodiments

When a surface tension of a liquid is measured, the tactile sensor 1 does not need to detect an axial force acting on the hair 10. Therefore, the tactile sensor 1 used for such a purpose is only necessary to have the displacement portion 30 displaceable at least in the x-direction. The displacement portion 30 may be unable to displace in the y-direction. The second displacement detector 82 that detects a displacement in the y-direction of the displacement portion 30 does not need to be disposed.

The hair 10 and the sensor main body may be configured as different members. By doing so, ones of various materials and shapes can be employed as the hair 10 installed in the tactile sensor 1. For example, human hair can be used as the hair 10.

Figure 7A:
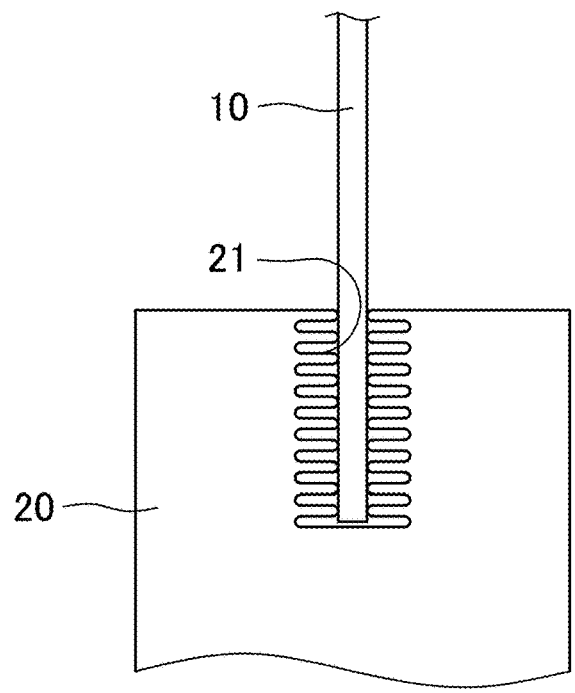
FIG. 7A is an enlarged view of a hair fixing portion of a tactile sensor according to another embodiment.

In this case, the hair 10 is fixed to the hair fixing portion 20 after forming the sensor main body. As illustrated in FIG. 7A, an insertion portion 21 in a depressed shape may be formed in the hair fixing portion 20. Inserting a base end portion of the hair 10 into the insertion portion 21 fixes the hair 10 in the hair fixing portion 20.

The insertion portion 21 has an inner wall on which two rows of comb teeth arranged to be opposed may be formed. Sandwiching the base end portion of the hair 10 with the two rows of comb teeth allows firmly fixing the hair 10 with respect to the hair fixing portion 20.

Figure 7B:
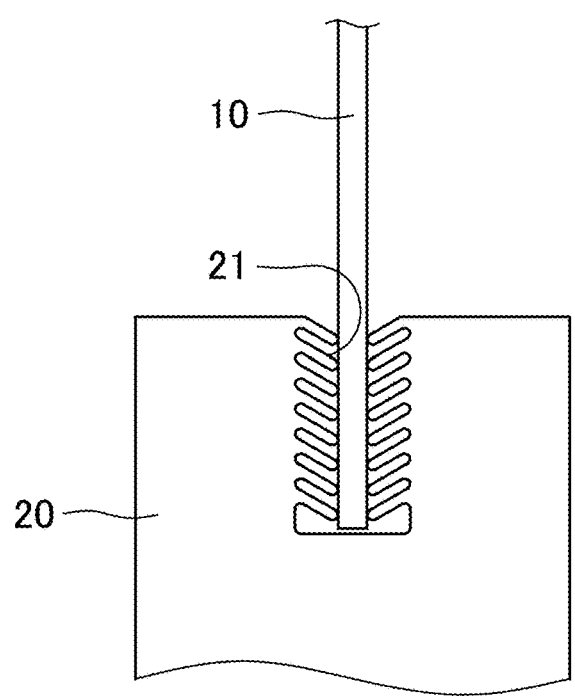
FIG. 7B is an enlarged view of a hair fixing portion of a tactile sensor according to yet another embodiment.

As illustrated in FIG. 7A, the plurality of teeth constituting the comb teeth may each be perpendicular to an insertion direction of the hair 10. As illustrated in FIG. 7B, the plurality of teeth constituting the comb teeth may each be inclined in the insertion direction of the hair from a base end toward a distal end. Inclining the teeth of the comb teeth in the insertion direction makes it easy to insert the hair 10 into the insertion portion 21 and less likely to be pulled out.

The hair 10 may be fixed to the hair fixing portion 20 with an adhesive. In this respect, the hair fixing portion 20 does not necessarily need to have the insertion portion 21.

The hair fixing portion support body 50 and the displacement portion support body 60 may be configured of a member other than the beam as long as desired elasticity can be obtained.

The turn detector 70 and the displacement detector 80 are not limited to the piezoresistive element. For example, the turn detector 70 may be configured to detect an electrostatic capacity between the hair fixing portion 20 and the base portion 40 by using that the distance between the hair fixing portion 20 and the base portion 40 changes by the turn of the hair fixing portion 20. Similarly, the displacement detector 80 may be configured to detect the electrostatic capacity between the displacement portion 30 and the base portion 40.

The method for manufacturing the tactile sensor 1 is not limited to the semiconductor micromachining techniques. For example, modeling techniques by a three-dimensional printer may be employed.

Examples (Designing and Manufacturing)

A semiconductor substrate was processed to manufacture the tactile sensor 1 illustrated in FIG. 1. As the semiconductor substrate, a p-type SOI substrate with 300 µm of a supporting substrate, 0.5 µm of an oxide film layer, and 50 µm of an active layer was used. The sensor main body is 6.3 mm laterally and 4.8 mm longitudinally.

The hair 10 has a length of 5 mm and a width of 10 µm. The material of the hair 10 is silicon. Setting the width of the hair 10 to 10 µm makes its rigidity approximately the same as human hair having a diameter of 50 µm, which is an average thickness.

It is considered that the smallest force perceivable by a human is 10 µN and the smallest moment perceivable by a human is 10 nNm. Based on this, target sensitivity of the tactile sensor 1 was set to 10 µN of force and 10 nNm of moment. In order to achieve this, a width of the beam (the narrow-width portion) where the piezoresistive element that configures the turn detector 70 and the displacement detector 80 is disposed was set to 13 µm.

(Property Evaluation)

Figure 8:
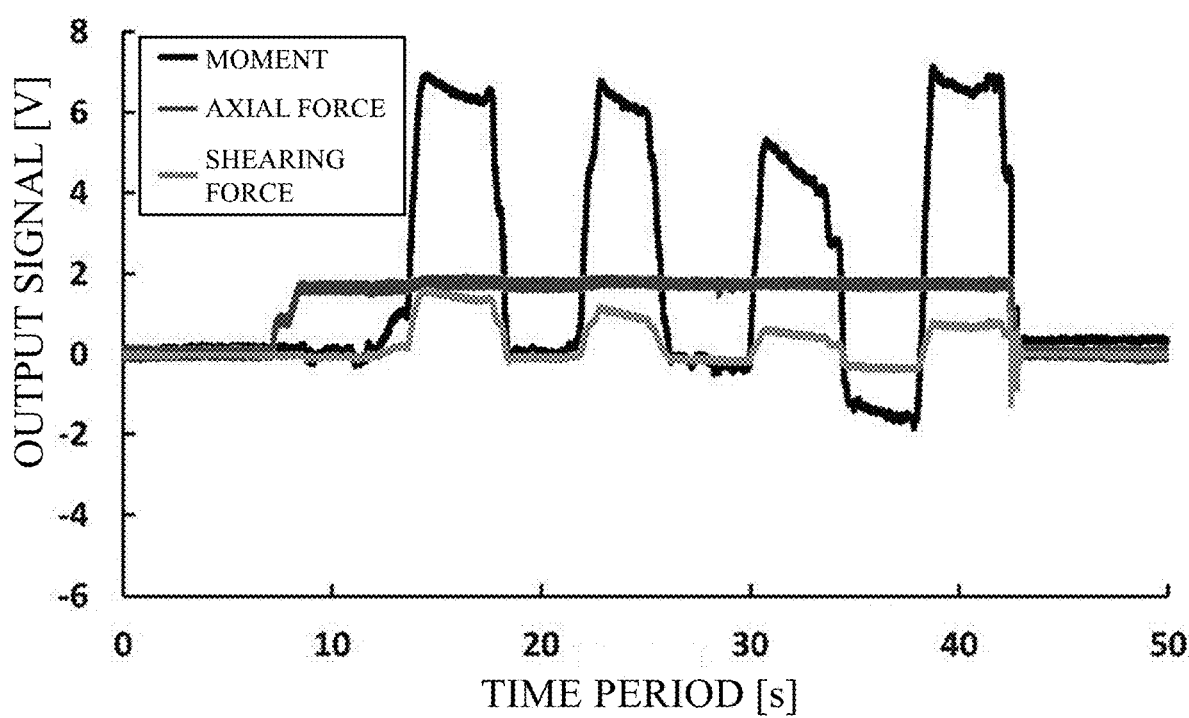
FIG. 8 is a graph illustrating results of property evaluations of the tactile sensor.

A property evaluation was performed on the manufactured tactile sensor 1. The results are illustrated in FIG. 8. In the graph in FIG. 8, the horizontal axis indicates a time period, the vertical axis indicates output signals of a moment, an axial force, and a shearing force. It was confirmed that the tactile sensor 1 could detect each of the moment, the axial force, and the shearing force that act on the hair 10. Cross-axis sensitivity was confirmed to be 2.3%, which was sufficiently low.

Sensitivity of the tactile sensor 1 was measured using a Micromechanical Testing And Assembly System (FEMTO TOOLS). As a result, the axial force was 5 µm, the shearing force was 1 µm, and the moment was 3 nNm. This confirmed that the tactile sensor 1 had achieved the target sensitivity.

(Independent Detection Evaluation)

Only by the above-described property evaluation, it cannot be concluded that the moment and the shearing force can be independently detected. Therefore, independent detection evaluations of the moment and the shearing force were performed. First, a specific shearing force $F_s$ was added to one point of the hair 10. Here, a distance from a center of moment of the hair 10 to a point of effort was set as L1. Output signals of a moment M1 and the shearing force $F_s$ at this time are illustrated in FIG. 9A.

Next, the same shearing force $F_s$ was added to another one point of the hair 10. Here, a distance from a center of moment of the hair 10 to a point of effort was set as L2. L2 has double the length of L1. Accordingly, a moment M2 acting on the hair 10 is double of M1. Output signals of the moment M2 and the shearing force $F_s$ at this time are illustrated in FIG. 9B.

Figure 9A:
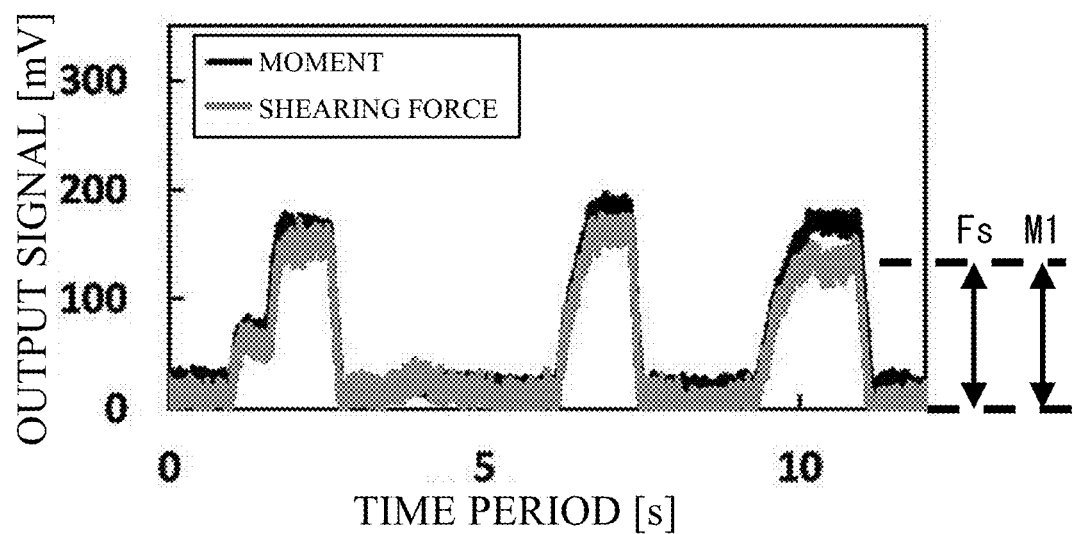
FIG. 9A is a graph illustrating output signals of a moment and a shearing force when a shearing force is applied on a point at a distance L1 from a center of moment.
Figure 9B:
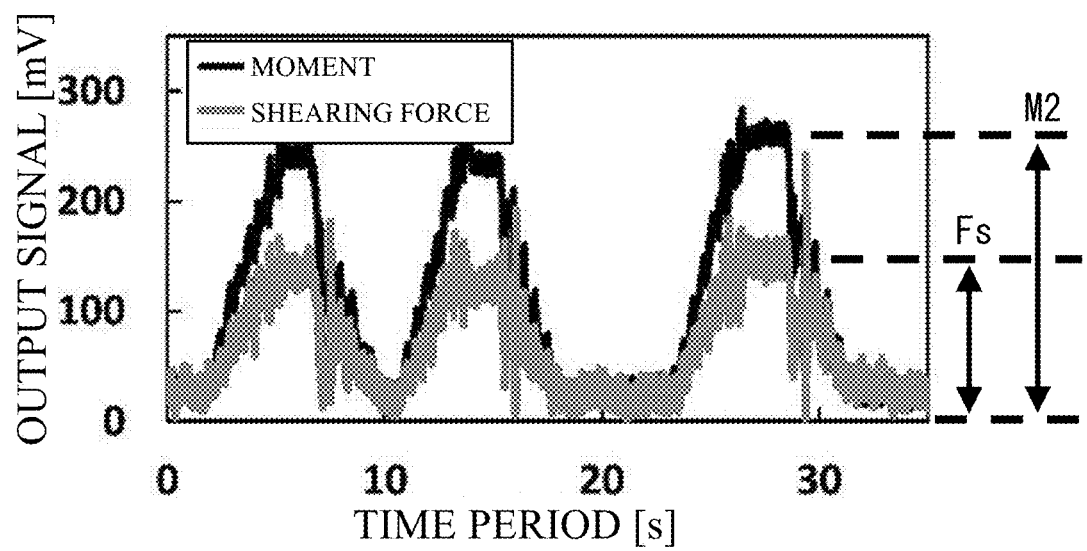
FIG. 9B is a graph illustrating output signals of a moment and a shearing force when a shearing force is applied on a point at a distance L2 from the center of moment.

As can be seen by comparing FIG. 9A with FIG. 9B, the change in the magnitude of the shearing force $F_s$ is not observed. On the other hand, the moment M2 is double of M1. This confirmed that the tactile sensor 1 could independently detect the moment and the shearing force.

(Surface Tension Measurement)

Next, a surface tension was measured using the tactile sensor 1.

A water and ethanol-water solutions of various concentrations (increments of 10 mass % in a range of 10 to 100 mass %) were used as measuring object liquids of surface tensions. A droplet of the measuring object liquid was formed on a distal end of a microsyringe. Here, the droplets were adjusted to always have the same size. The hair 10 of the tactile sensor 1 had its distal end inserted up to the center of the droplet. Next, the microsyringe was moved in the x-direction at a constant speed. After the distal end portion of the hair 10 reach a surface of the droplet, the hair 10 bends due to the surface tension of the droplet. After the droplet further moves, the hair 10 separates from the surface of the droplet.

Figure 10A:
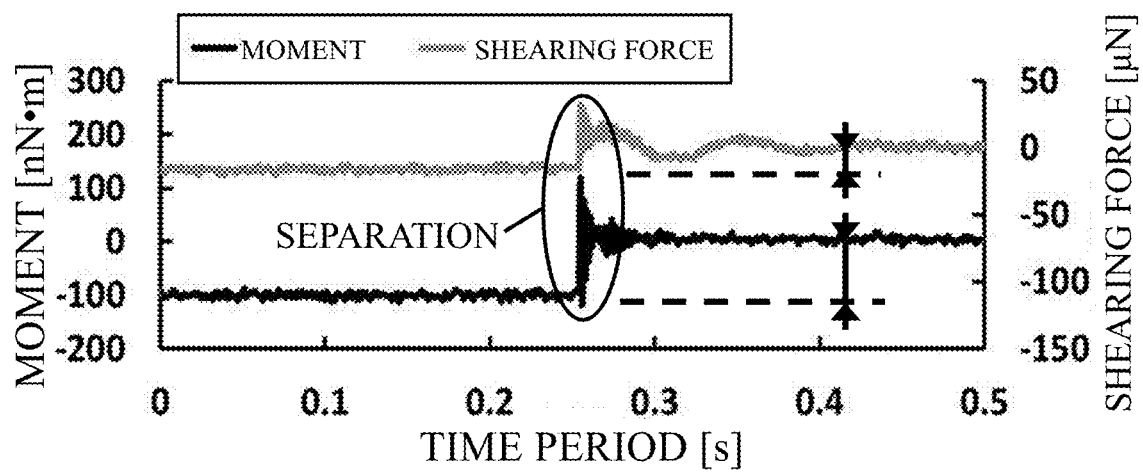
FIG. 10A is a graph illustrating output signals of a moment and a shearing force when a water is used as a measuring object liquid.
Figure 10B:
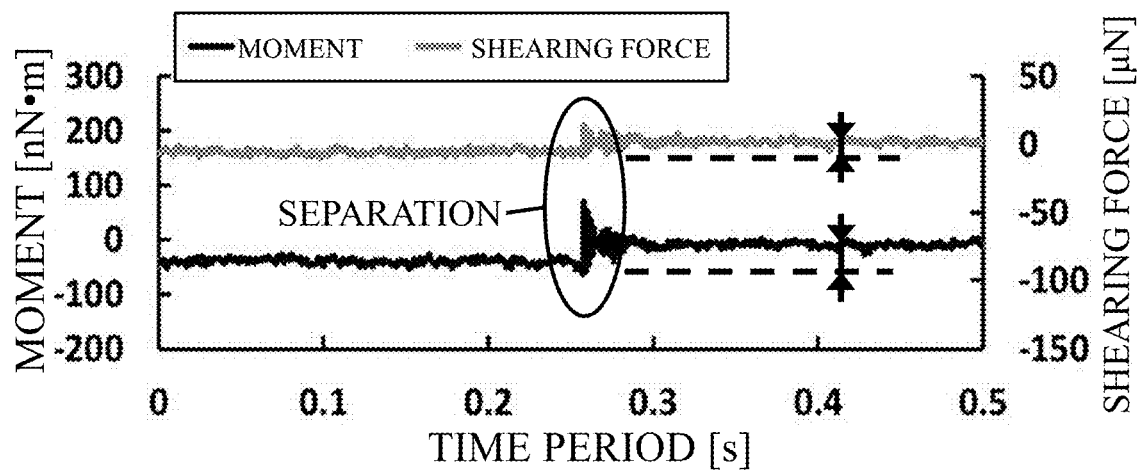
FIG. 10B is a graph illustrating output signals of a moment and a shearing force when an ethanol-water solution (50 mass %) is used as a measuring object liquid.

FIG. 10A illustrates a graph of output signals of the moment and the shearing force obtained from the tactile sensor 1 when a water (0 mass % of ethanol concentration) was used as the measuring object liquid. FIG. 10B illustrates a graph of output signals of the moment and the shearing force obtained from the tactile sensor 1 when an ethanol-water solution (50 mass % of ethanol concentration) was used as the measuring object liquid. The moment M and the shearing force $F_s$ generated by the surface tension were obtained from the difference of signals before and after the hair 10 was separated from the droplet. It can be seen that the difference is generated in the moment M and the shearing force $F_s$ from the difference of the measuring object liquids by comparing FIG. 10A with FIG. 10B.

Figure 11:
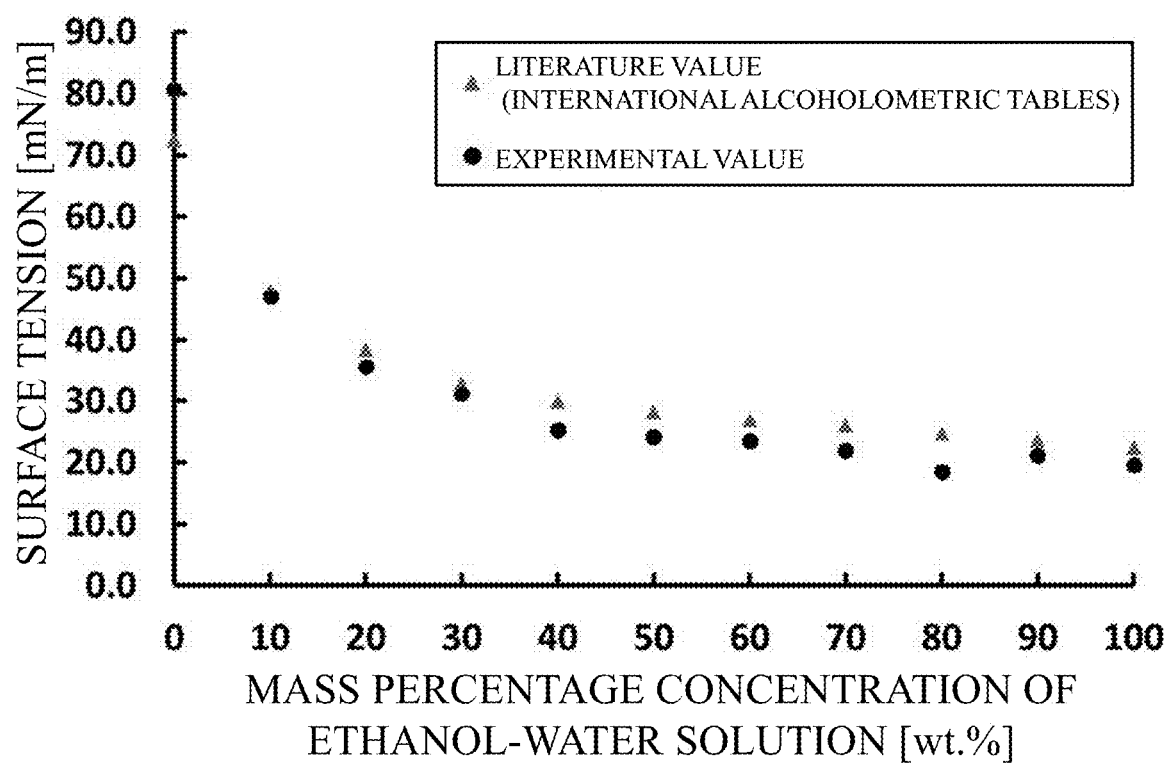
FIG. 11 is a graph illustrating surface tensions (experimental values) obtained from output signals of the tactile sensor and surface tensions (literature values) cited from the International alcoholometric tables.

The tactile sensor 1 obtained the moment M and the shearing force $F_s$ for each of measuring object liquids, and the surface tensions w were obtained based on the formula (3). The results are illustrated as experimental values in FIG. 11. The horizontal axis in the graph in FIG. 11 indicates an ethanol concentration and the vertical axis indicates the surface tension. The graph in FIG. 11 illustrates values of surface tensions of ethanol-water solutions cited from the International alcoholometric tables (translated and edited by National Research Laboratory of Metrology: International Organization of Legal Metrology (OIML), the International alcoholometric tables (Japanese version), page 16, 1977) as literature values. It can be seen that tendencies of the surface tensions with respect to the ethanol concentrations are approximately correspond by comparing the experimental values with the literature values. An error between the experimental values and the literature values was approximately 14% in average. This confirmed that the tactile sensor 1 could measure a surface tension of a liquid almost accurately.

(Static Electricity Measurement Test)

Next, static electricity was measured using the tactile sensor 1.

The tactile sensor 1 was placed on a vibration device and was vibrated in the x-direction. A vibration device that vibrates by a piezo actuator was used as the vibration device. The vibration device can vibrate the tactile sensor 1 at a desired frequency. Output signals from the tactile sensor 1 were frequency-analyzed by a spectrum analyzer.

While changing excitation frequencies to the tactile sensor 1 without applying an electrostatic attractive force, an amplitude of a moment obtained by the tactile sensor 1 was obtained. Next, an electrostatic attractive force of 1 µN was applied in the x-direction to the hair 10 of the tactile sensor 1. Under this condition, while changing the excitation frequencies to the tactile sensor 1, an amplitude of a moment obtained by the tactile sensor 1 was obtained.

These results are illustrated in a graph in FIG. 12. The horizontal axis in the graph in FIG. 12 indicates the excitation frequency to the tactile sensor 1. The vertical axis indicates the amplitude of the moment obtained by the tactile sensor 1. It can be seen that the resonance frequency of the hair 10 shifts in the negative direction when the electrostatic attractive force is applied. This confirmed that the electrostatic attractive force could be measured from the change of the resonance frequency of the hair 10. It was also confirmed that the sensitivity could be increased by approximately ten times compared with the case where the electrostatic attractive force is directly obtained from the shearing force detected by the tactile sensor 1.

REFERENCE SIGNS LIST

1 Tactile sensor
10 Hair
20 Hair fixing portion
30 Displacement portion
40 Base portion
50 Hair fixing portion support body
60 Displacement portion support body
70 Turn detector
80 Displacement detector
81 First displacement detector
82 Second displacement detector

The invention claimed is:

1. A tactile sensor comprising:
a base portion;
a displacement portion;
a displacement portion support body that supports the displacement portion in a displaceable manner at least in a first direction with respect to the base portion;
a hair in a straight line arranged along a second direction perpendicular to the first direction;
a hair fixing portion to which a base end of the hair is fixed;
a hair fixing portion support body that supports the hair fixing portion turning within a plane including the first direction and the second direction with respect to the displacement portion;
a displacement detector that detects a displacement of the displacement portion with respect to the base portion; and
a turn detector that detects a turn of the hair fixing portion with respect to the displacement portion.

2. The tactile sensor according to claim 1, wherein
the displacement portion support body supports the displacement portion in a displaceable manner also in the second direction with respect to the base portion, and
the displacement detector includes:
a first displacement detector that detects a displacement in the first direction of the displacement portion; and
a second displacement detector that detects a displacement in the second direction of the displacement portion.

3. The tactile sensor according to claim 1, wherein the hair is integrally formed with the hair fixing portion.

4. The tactile sensor according to claim 1, wherein the hair fixing portion includes an insertion portion in a depressed shape, and the hair has a base end portion inserted into the insertion portion.

5. The tactile sensor according to claim 4, wherein
the insertion portion has an inner wall on which two rows of comb teeth arranged to be opposed are formed.

6. The tactile sensor according to claim 5, wherein
a plurality of teeth constituting the comb teeth are each inclined in an insertion direction of the hair from a base end toward a distal end.

7. The tactile sensor according to claim 1, wherein the hair is fixed with an adhesive to the hair fixing portion.

* * * * *